March 1, 1932. G. F. BURWOOD 1,847,590
APPLICATION OF PHOTOGRAPHY TO THE RECORDING OF THE READING OF
METERS OR REGISTERS IN TELEPHONE EXCHANGES
Filed Jan. 23, 1931 3 Sheets-Sheet 1
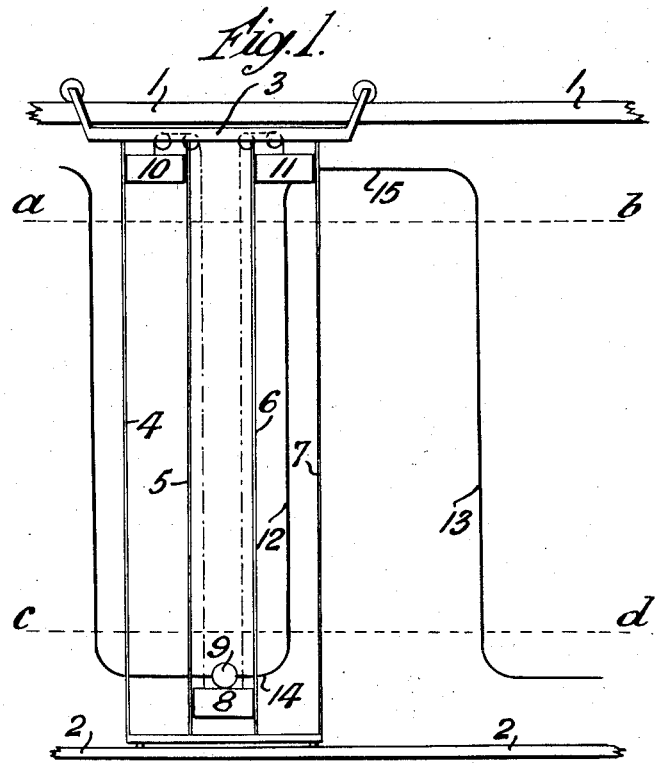
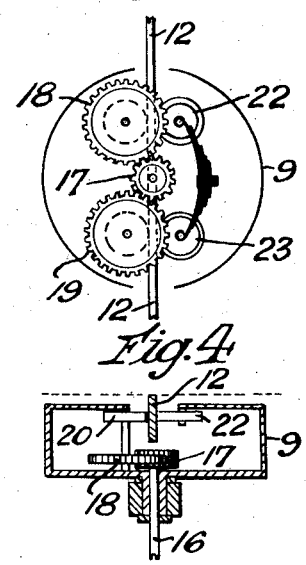
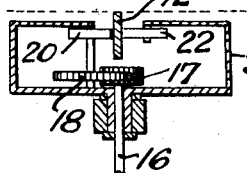
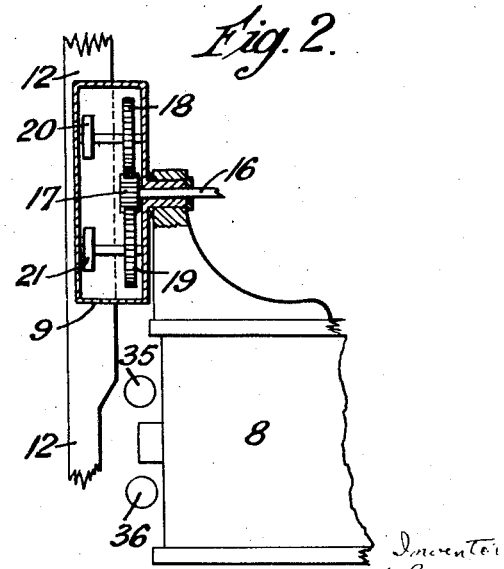

March 1, 1932. G. F. BURWOOD 1,847,590
APPLICATION OF PHOTOGRAPHY TO THE RECORDING OF THE READING OF
METERS OR REGISTERS IN TELEPHONE EXCHANGES
Filed Jan. 23, 1931 3 Sheets-Sheet 2

Inventor
George F. Burwood,
By his Attorneys,
Baldwin Wight

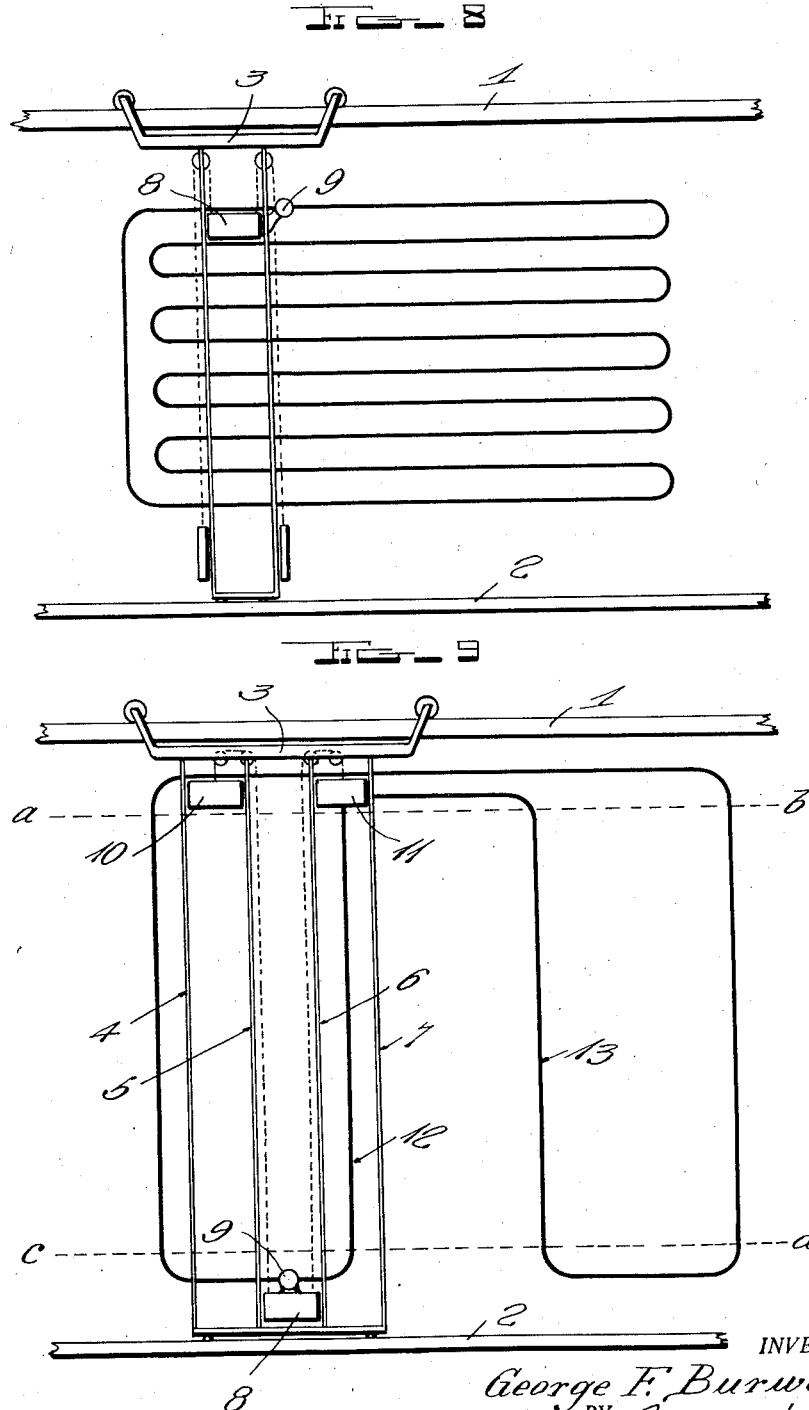

Patented Mar. 1, 1932

1,847,590

UNITED STATES PATENT OFFICE

GEORGE FREDERICK BURWOOD, OF LONDON, ENGLAND

APPLICATION OF PHOTOGRAPHY TO THE RECORDING OF THE READING OF METERS OR REGISTERS IN TELEPHONE EXCHANGES

Application filed January 23, 1931, Serial No. 510,837, and in Great Britain February 3, 1930.

The present invention relates to a method and apparatus for obtaining a photographic record of the indications of meters or registers in telephone exchanges.

The indicating mechanism of the meter associated with a subscriber's circuit comprises four digits representing thousands, hundreds, tens and units, the numerical difference between a reading and a preceding reading giving a measure of the extent to which charges have been incurred in respect of calls originated during the intervening period. The meters are segregated and mounted on racks in such manner that the covers, through which appear the digits of the indicating mechanism and on which appear the numbers of the meters, lie in a vertical plane.

The object of the invention is to provide an apparatus whereby a photographic record of the individual indications of a bank of meters is obtained in which each indicating mechanism together with the number of the meter with which it is associated preferably forms the subject of a separate photograph, the order and size of presentation of such photographs being invariable whereby the records may be associated in juxtaposition, meter for meter, with other records made previously or subsequently.

Apparatus for carrying out such photographic recording of meter readings in accordance with the present invention comprises a trolley or chassis adapted to run on a track extending the whole length of the meter field said trolley or chassis having guide members on which are slidably mounted the photographic apparatus and the driving apparatus, said driving apparatus being adapted to engage with and operate on a guide means distributed in a manner whereby the whole meter field is explored.

The guide mean may be continuous and in fixed relationship to the meters throughout its length or it may be discontinuous in which case it is in part in fixed relationship to the meters and in part carried by the trolley or chassis.

The photographic apparatus may be suitably operated through the medium of mechanism associated therewith and adapted to engage with an operating means in fixed position in relation to the meters, said mechanism being operated through and by virtue of the movement of the photographic apparatus. Such operating means may be constituted by or formed with the guide members on which the apparatus is slidably mounted, the guide means on which the driving apparatus operates, or such similar means as it may be found more convenient to provide for the purpose.

The invention is described in detail with reference to the accompanying drawings in which:—

Figure 1 is a diagrammatic view, in front elevation, of a suitable distribution of the apparatus in relation to a section of the meter field whereby the photography of the meters may be effected in vertical sections.

Figure 2, shows, in side elevation, the essential features of construction of the driving mechanism in relation to the guide means on which it is adapted to operate and in one of the permissible positions in relation to the photographic apparatus.

Figure 3 shows the driving mechanism in front elevation.

Figure 4 shows the driving mechanism in plan.

Figures 8 and 9 show diagrammatically alternative arrangements of the guide means.

Figure 5:
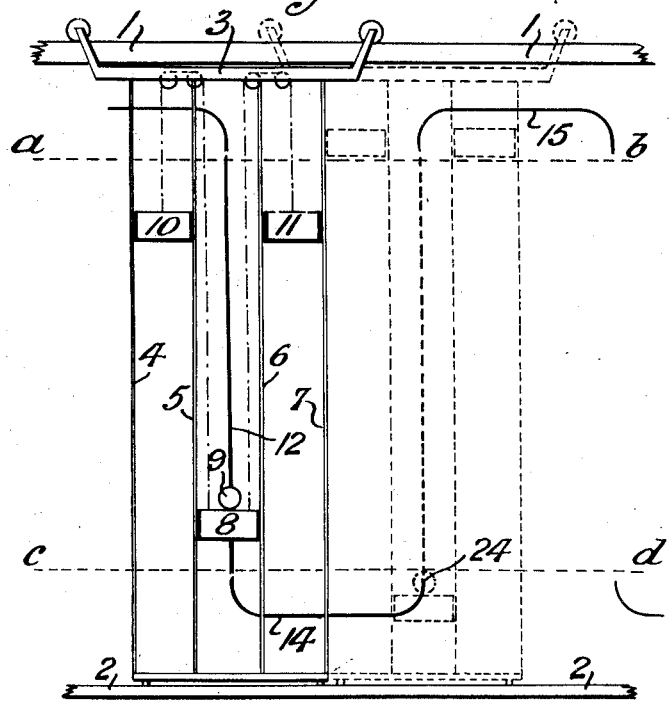
Figure 5 is a diagrammatic view, in front elevation, of an alternative arrangement to that shown in Figure 1 wherein the guide means is discontinuous.

Referring to Figure 1 the broken lines $a$, $b$ and $c$, $d$ represent the boundaries of a section of the meter field. Above the meter field is a track rail 1 and below is a guide 2. The positions of these may be reversed the track rail being below and the guide above the meter field.

On the track rail 1 travels a carriage 3 to which are fixed such vertical guides as are required by the distribution of the apparatus. Four vertical guides 4, 5, 6, 7 are shown and these are suitably united at the bottom and retained in the guide 2. The track rail 1 and the guide 2 are so positioned that the vertical guides 4, 5, 6, 7 are parallel to and maintain a uniform distance from the plane of the meters as the carriage 3 travels throughout the length of the track rail 1.

The photographic apparatus and driving apparatus are mounted in a manner to permit movement on the vertical guides 4, 5, 6, 7, a free movement being attained by the distribution of the driving apparatus 9 and the cameras 8, 10, 11 in the positions of a mutual counterpoise. The distribution of the apparatus may be in any convenient manner and the counterpoise may comprise a weight or weights. The driving apparatus 9 has been shown as associated with photographic apparatus 8. It may, however, occupy any position, with or without associated photographic apparatus, and when associated with photographic apparatus it may be in any position in relation thereto provided that the illumination of the meters or the optical field of the cameras are not obscured.

The horizontal movement of the carriage 3 on the track rail 1 and the vertical movement of the driving apparatus 9 and the cameras 8, 10, 11 on the vertical guides, 4, 5, 6, 7 permit the propulsion of the cameras over the vertical plane of the meters in a path determined by the distribution of a guide means, designated a "rack strip", fixed in a suitable position in relation to the meters, on which the driving apparatus 9 is adapted to operate. As shown in Figure 1 the photography of the meters will be effected in vertical sections by the operation of the driving apparatus 9 on a rack strip which is compounded of two forms, vertical traversing sections of rack strip 12, 13 and connecting sections of rack strip 14, 15 so distributed as to form a continuous track.

The driving apparatus 9 comprises a "driving head" of the essential features of construction shown in Figures 2, 3 and 4. The drive operates through the shaft 16 and the pinion 17 to the pinion wheels 18, 19 with which are associated the driving wheels 20, 21 in engagement with the rack strip 12. The provision of two wheels on at least one side of the rack strip ensures that the drive is transmitted tangentially on the curves of the connecting sections of rack strip. The driving wheels 20, 21 are retained in contact with the rack strip by a wheel or wheels sprung in contact with the rack strip on the opposite side. Two such wheels 22, 23 are shown. The driving head is free to rotate about the driving shaft 16 and, to preclude a lateral displacement of the photographic apparatus with respect to the meters, the mechanism of the driving head is so distributed as to ensure that the axis of the driving shaft 16 is coincident with the axis of the traversing section of rack strip 12.

The path of the cameras may be described as follows with reference to Figure 1.

The direction of operation is assumed to be from left to right and the cameras 8, 10, 11 are being propelled in a horizontal direction determined by the operation of the driving head 9 on the connecting section of rack strip 14 and by the movement of the carriage 3 on the track rail 1. As the driving head 9 operates on the curve of the connecting section of rack strip 14 the movement of the carriage 3 on the track rail 1 diminishes until the carriage 3 becomes stationary when the driving head 9 enters the traversing section of rack strip 12. In the meantime the cameras 8, 10, 11 assume a complementary vertical movement attaining a maximum speed with the cessation of the horizontal movement of the carriage 3 on the track rail 1. Thereafter the cameras 8, 10, 11 are propelled vertically over the meter field until the driving head 9 operates on the curve of the connecting section of rack strip 15 when the vertical movement diminishes as the horizontal movement, via the movement of the carriage 3 on the track rail 1, increases.

The drive of the motor is continuous and is expended in the alternate horizontal movement of the carriage 3 on the track rail 1 and the vertical movement of the cameras 8, 10, 11 over the meter field thereby permitting the photography of the meters in vertical sections. If horizontal traversing sections of rack strip be distributed over the meter field and suitably connected, outside the meter field, at the ends the photography of the meters may be effected in horizontal sections during such time as the carriage 3 is in motion on the track rail 1. Such a distribution of rack-strip is shown diagrammatically in Figure 8.

An alternative embodiment of the invention is illustrated in Figure 5. As the driving head 9 is so constructed as to preclude a displacement of the photographic apparatus with respect to the traversing sections of rack strip it is possible to obtain a continuous operation as described with reference to Figure 1 by providing a traversing section of rack strip on the carriage 3 to replace all the traversing sections of rack strip in fixed positions in relation to the meters.

In Figure 5 the traversing section of rack strip 12 is fixed in relation to the vertical guides 4, 5, 6, 7 and, therefore, retains a permanent position in the path of the driving head 9. The drive is assumed to be descending and when, after having traversed the connecting section of rack strip 14, the driving head 9 reaches the end 24 of the connecting section of rack strip 14 it will be ascending and the lower end of the traversing section of rack strip 12 will have "lined up" with the end 24 of the connecting section of rack strip 14 to permit the drive to operate continuously. The connecting section of rack strip 15 at the top is so positioned as to ensure continuity with the traversing section of rack strip 12 in the position now assumed. By this arrangement the provision of rack strip in fixed position in relation to the meters is limited to the connecting sections, wholly outside the meter field, at top and bottom.

Figure 6:
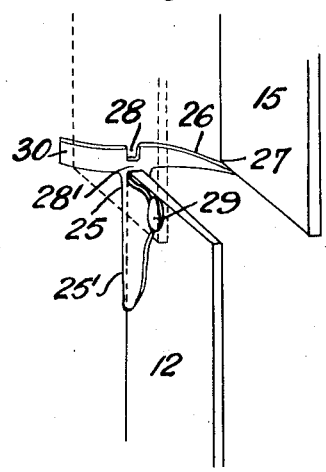
Figure 6 is a detailed perspective view of an interlocking device for use with the discontinuous guide means as employed in the alternative arrangement shown in Figure 5.

To preclude movement of the carriage 3 on the track rail 1 when the driving head 9 is operating vertically there are provided locking devices which devices may be either at each end of the connecting sections of rack strip 14, 15 to engage the traversing section of rack strip 12 or at top and bottom of the traversing section of rack strip 12 to engage the connecting sections of rack strip 14, 15. In Figure 6 is depicted a form of such locking device mounted on the traversing section of rack strip 12 the construction being such as to (a) lock the traversing section of rack strip 12 to the connecting sections of rack strip at each stage of movement in the direction of operation, (b) permit release by the passage of the driving head and (c) permit a free movement of the carriage 3 on the track rail 1 in the reverse direction to the direction of operation.

The locking device 25 assumes the position shown under the tension of spring means (not shown) which act vertically upwards and also horizontally so as to maintain the shank portion 25' in contact with the edge of the rack strip 12. The vertical movement of the locking device may be limited by providing a slot of suitable length in the shank portion 25' said slot engaging a pin or projection on the rear edge of the strip 12. Movement of the traversing section of rack strip 12 in the direction of operation—from left to right—engages the ramp 26 of the locking device 25 with the end 27 of the connecting section of rack strip 15, or a suitable addition thereto, resulting in the depression of the locking device 25 vertically downwards, against the tension of the spring already referred to, until the ends of the sections of rack strip 12, 15 are in line when the slot 28 of the locking device 25 engages the connecting section of rack strip 15.

A similar locking device is provided at the lower end of the traversing section of rack strip 12 and the carriage will thereby be locked at both top and bottom of the traversing section of rack strip 12.

Associated with the locking device is a wheel 29 which lies sufficiently in the path of the driving head 9 as to result in the release of the locking action by the locking device 25 being forced away from the traversing section of rack strip 12 in a horizontal direction by the driving head 9 during the passage of the latter from the traversing to the connecting sections of rack strip, or vice-versa. The locking device is now free to move vertically upwards under the restoring action of the vertically acting spring and the corner 27 of the strip 15 engages the portion 28' below the slot 28 thus preventing re-engagement of the locking device.

By the provision of such locking devices the carriage 3 will be locked in position until the driving head 9 has entered a connecting section of rack strip preparatory to the transfer of the apparatus to the adjacent section of the meters.

By a suitable form of "trailing" end 30 to the locking device 25 the said device will not be depressed when it engages the connecting section of rack strip 15 by movement in the reverse direction—right to left—to the direction of operation but it will be deflected away from the traversing section of rack strip 12 thus allowing free movement in this direction.

The feed of the films of the cameras and the operation of the shutters may be effected by mechanism actuated through and by virtue of the movement of the cameras in relation to the meters. The feed of the films will, therefore, be proportional to the distance of travel of the cameras and the presentation of the photographic results will be uniformly distributed on the films although the travel of the cameras may vary in speed.

Figure 7:
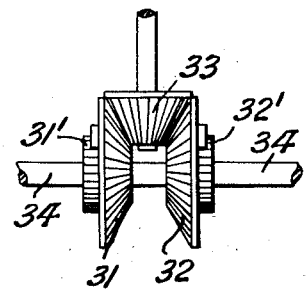
Figure 7 shows a non-reversing driving means by which a uni-directional feed of the films of the cameras may be ensured.

As the cameras reverse their direction of travel it is necessary to obtain a uni-directional feed of the films; a suitable form of mechanism for this purpose is shown in Figure 7. The two bevel gear wheels 31, 32 are in mesh with the bevel gear wheel 33, this wheel being on a fixed centre. The two wheels 31, 32 are free on the shaft 34 but engage the shaft 34 each by a ratchet and pawl gear 31', 32' so that each wheel turns the shaft in the same direction. If, therefore, by a rotation clockwise of the wheel 31 the shaft 34 is rotated clockwise by a direct engagement of the ratchet and pawl, the wheel 32 will rotate anti-clockwise, freely, on the shaft 34. If the same wheel 31 be rotated anti-clockwise it will rotate freely on the shaft 34 but the wheel 32 will rotate clockwise and impart a clockwise rotation to the shaft as before. The films are driven from the shaft 34 and the feed of the films will, therefore, be uni-directional irrespective of the direction of movement of the cameras.

The shutters of the cameras may be operated by suitable tripping devices spaced in a manner to ensure exposures as required, that is according as to whether each meter is to form the subject of a separate photograph or whether the meters are to be grouped.

The small optical field of the cameras and their proximity to the meters will enable the illumination of the meters to be sufficiently intense to permit a short exposure time and, therefore, a high speed of operation. A suitable position of the source of illumination is shown in Figure 2 wherein the lamps 35, 36 are above and below the lenses of the cameras.

The order of presentation of the photographic results will be invariable when operation is performed in any one direction or when the direction of the feed of the films is reversed in association with a reversal in the direction of travel of the cameras. Operation in one direction may be readily attained by the provision of a connecting section of rack strip to effect the transfer of the apparatus from the finishing direct to the starting point in the manner illustrated diagrammatically in Figures 8 and 9.

What I claim is:—

1. Apparatus for photographically recording the readings of meters in a telephone exchange comprising a travelling member, a track for said travelling member, said track extending substantially the whole length of the meter field, guide members transverse to the track mounted on said travelling member, photographic means slidably mounted on said guide members, guide means extending in a serpentine course with respect to said track and driving means engaging said guide means for moving said photographic means to explore the meter field.

2. Apparatus for photographically recording the readings of meters in a telephone exchange comprising a travelling member, a track for said travelling member, said track extending substantially the whole length of the meter field, guide members transverse to the track mounted on said travelling member, photographic means slidably mounted on said guide members, guide means extending in a serpentine course with respect to said track and driving means engaging said guide means for moving said photographic means to explore the meter field, said guide means being so distributed over the meter field as to permit the photographing of the meters in substantially horizontal sections.

3. Apparatus for photographically recording the readings of meters in a telephone exchange comprising a travelling member, a track for said travelling member said track extending substantially the whole length of the meter field, guide members transverse to the track mounted on said travelling member, photographic means slidably mounted on said guide members, guide means extending in a serpentine course with respect to said track and driving means engaging said guide means for moving said photographic means to explore the meter field said guide means being so distributed over the meter field as to permit the photographing of the meters in substantially vertical sections.

4. Apparatus for photographically recording the readings of meters in a telephone exchange comprising a travelling member, a track for said travelling member, said track extending substantially the whole length of the meter field, guide members transverse to the track mounted on said travelling member, photographic means slidably mounted on said guide members, guide means extending in a serpentine course with respect to said track and driving means engaging said guide means for moving said photographic means to explore the meter field, said guide means being in fixed position in relation to the meters.

5. Apparatus for photographically recording the readings of meters in a telephone exchange comprising a travelling member, a track for said travelling member, said track extending substantially the whole length of the meter field, guide members transverse to the track mounted on said travelling member, photographic means slidably mounted on said guide members, discontinuous guide means extending in a serpentine course with respect to said track and driving means engaging said guide means for moving said photographic means to explore the said discontinuous guide means being in part in fixed position in relation to the meters and in part in fixed position on the travelling member meter field.

6. Apparatus for photographically recording the readings of meters in a telephone exchange comprising a travelling member, a track for said travelling member, said track extending substantially the whole length of the meter field, guide members transverse to the track mounted on said travelling member, photographic means slidably mounted on said guide members, guide means constituted by an endless rail member extending in a serpentine course closed upon itself and driving means engaging said guide means for moving said photographic means to explore the meter field, said guide means being so distributed over the meter field as to permit the photographing of the meters in substantially horizontal sections.

7. Apparatus for photographically recording the readings of meters in a telephone exchange comprising a travelling member, a track for said travelling member said track extending substantially the whole length of the meter field, guide members transverse to the track mounted on said travelling member, photographic means slidably mounted on said guide members, guide means constituted by an endless rail member extending in a serpentine course closed upon itself and driving means engaging said guide means for moving said photographic means to explore the meter field, said guide means being so distributed as to permit the photographing of the meters in substantially vertical sections.

8. Apparatus for photographically recording the readings of meters in a telephone exchange comprising a travelling member, a track for said travelling member, said track extending substantially the whole length of the meter field, guide members transverse to the track mounted on said travelling member, photographic means slidably mounted on said guide members, guide means extending in a serpentine course with respect to said track driving means engaging said guide means for moving said photographic means to explore the meter field and uni-directional driving means for feeding camera film in accordance with the movement of said photographic means.

In testimony that I claim the foregoing as my invention I have signed my name this 9th day of January, 1931.

GEORGE FREDERICK BURWOOD.